United States Patent
Kim et al.

(10) Patent No.: US 9,871,640 B2
(45) Date of Patent: *Jan. 16, 2018

(54) METHOD FOR APERIODIC FEEDBACK OF CHANNEL STATE INFORMATION IN A WIRELESS ACCESS SYSTEM SUPPORTING MULTI-CARRIER AGGREGATION

(71) Applicant: LG ELECTRONICS INC., Seoul (KR)

(72) Inventors: Soyeon Kim, Anyang-si (KR); Jaehoon Chung, Anyang-si (KR); Seunghee Han, Anyang-si (KR); Minseok Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,477

(22) Filed: Aug. 11, 2016

(65) Prior Publication Data

US 2017/0033913 A1    Feb. 2, 2017

Related U.S. Application Data

(63) Continuation of application No. 14/706,615, filed on May 7, 2015, now Pat. No. 9,450,731, which is a
(Continued)

(51) Int. Cl.
*H04L 5/00* (2006.01)
*H04W 24/10* (2009.01)
(Continued)

(52) U.S. Cl.
CPC ......... *H04L 5/0057* (2013.01); *H04B 7/0647* (2013.01); *H04L 5/0053* (2013.01);
(Continued)

(58) Field of Classification Search
None
See application file for complete search history.

(56) References Cited

U.S. PATENT DOCUMENTS 9,094,966 B2    7/2015  Kim et al.
9,450,731 B2    9/2016  Kim et al.
(Continued)

FOREIGN PATENT DOCUMENTS

CN    101826949 A    9/2010
CN    102082625 A    6/2011
(Continued)

OTHER PUBLICATIONS

Texast Instruments: "UCI Transmission on PUSCH for carrier aggregation", 3GPP Draft; R1-103694 TI UCI Transmission on PUSCH for Carrier Aggregation_V5, 3rd Generation Partnership Project (3GPP), Mobile Competence Centre; 650, Route des Lucioles; F-06921 Sophia-Antipolis Cedex; France, vol. RAN WG1, No. Dresden, Germany; Jun. 28, 2010, Jun. 22, 2010, XP050449131.
(Continued)

*Primary Examiner* — Chi H Pham
*Assistant Examiner* — Raul Rivas
(74) *Attorney, Agent, or Firm* — Dentons US LLP

(57) ABSTRACT

The present invention relates to a wireless access system supporting multi-carrier aggregation (CA) and discloses various methods and devices for aperiodic feedback of channel state information (CSI). The method for aperiodic feedback of the channel state information (CSI) in the wireless access system supporting the multi-carrier aggregation (CA), according to an embodiment of the present invention, comprises the steps of: receiving a first message including an aperiodic CSI request field and uplink grant from a base station; receiving a second message including
(Continued)

bitmap information indicating a downlink component carrier (DL CC) subjected to CSI measurement from the base station; measuring the CSI in consideration of at least one of the aperiodic CSI request, uplink grant, and bitmap information; and transmitting the measured CSI to the base station through a physical uplink shared channel (PUSCH) to thereby receive aperiodic feedback of the same.

18 Claims, 12 Drawing Sheets

Related U.S. Application Data continuation of application No. 13/811,876, filed as application No. PCT/KR2011/003390 on May 6, 2011, now Pat. No. 9,094,966.

(60) Provisional application No. 61/367,863, filed on Jul. 26, 2010, provisional application No. 61/368,640, filed on Jul. 28, 2010, provisional application No. 61/407,433, filed on Oct. 27, 2010, provisional application No. 61/410,363, filed on Nov. 5, 2010, provisional application No. 61/416,740, filed on Nov. 24, 2010.

(51) Int. Cl.
  *H04W 72/04* (2009.01)
  *H04B 7/06* (2006.01)
  *H04W 76/04* (2009.01)
  *H04W 72/14* (2009.01)

(52) U.S. Cl.
  CPC ......... *H04W 24/10* (2013.01); *H04W 72/042* (2013.01); *H04W 72/0413* (2013.01); *H04W 72/0446* (2013.01); *H04W 72/0453* (2013.01); *H04W 72/14* (2013.01); *H04W 76/046* (2013.01); *H04L 5/001* (2013.01)

(56) References Cited

U.S. PATENT DOCUMENTS

| 2007/0293230 | A1 | 12/2007 | Lee |
| 2008/0260062 | A1 | 10/2008 | Imamura |
| 2009/0168718 | A1 | 7/2009 | Wang |
| 2010/0027456 | A1 | 2/2010 | Onggosanusi et al. |
| 2010/0056170 | A1 | 3/2010 | Lindoff et al. ............. 455/452.1 |
| 2010/0098012 | A1 | 4/2010 | Bala et al. |
| 2012/0002568 | A1 | 1/2012 | Tiirola et al. |

FOREIGN PATENT DOCUMENTS

| CN | 102907029 A | 1/2013 |
| CN | 102918790 A | 2/2013 |
| EP | 2555577 A1 | 2/2013 |
| JP | 2012-519410 A | 8/2012 |
| JP | 2013-516921 A | 5/2013 |
| JP | 2013-524561 A | 6/2013 |
| JP | 2013-530559 A | 7/2013 |
| KR | 10-2005-0081528 | 8/2005 |
| KR | 10-2006-0004870 | 1/2006 |
| KR | 10-2008-0061742 | 7/2008 |
| KR | 10-2012-0135336 A | 12/2012 |
| RU | 2007140441 A | 5/2009 |
| WO | 2008/105421 A1 | 9/2008 |
| WO | 2009088225 A2 | 7/2009 |
| WO | 2010013963 A2 | 2/2010 |
| WO | 2010/077051 A2 | 7/2010 |
| WO | 2011/116823 A1 | 9/2011 |
| WO | 2011134174 A1 | 11/2011 |

OTHER PUBLICATIONS

"3rd generation partnership project; Technical specification group radio access network; Evolved universal terrestrial radio access (E-UTRA); Physical layer procedures (Release 9)", 3GPP Standard: 3GPP TS 36.213, 3rd Generation Partnership Project (3GPP), Mobile Competence Centre; 650, Route des Lucioles; F-06921 Sophia-Antipolis Cedex; France, No. 9.2.0, Jun. 10, 2010, pp. 1-80, XP050441595.

Huawei, HiSilicon: "Triggering and transmission of aperiodic CSI reports", 3GPP TSG RAN WG1 Meeting #62bis, R1-105128, Xi'an, China, Oct. 11-15, 2010.

3GPP TS 36.331 V9.3.0 Release 9, XP050441910, Oct. 2010.

METHOD FOR APERIODIC FEEDBACK OF CHANNEL STATE INFORMATION IN A WIRELESS ACCESS SYSTEM SUPPORTING MULTI-CARRIER AGGREGATION

This application is a continuation of Ser. No. 14/706,615 filed May 7, 2015, now allowed, which is a continuation of Ser. No. 13/811,876 filed Jan. 23, 2013, which is a 35 USC §371 National Stage entry of International Application No. PCT/KR2011/003390 filed on May 6, 2011, and claims priority to U.S. Provisional Application No. 61/367,863 filed on Jul. 26, 2010, 61/368,640 filed on Jul. 28, 2010, 61/407,433 filed Oct. 27, 2010, 61/410,363 filed Nov. 5, 2010, and 61/416,740 filed Nov. 24, 2010, all of which are hereby incorporated by reference in their entireties as if fully set forth herein.

TECHNICAL FIELD

The present invention relates to a wireless access system supporting multicarrier aggregation, and more particularly, to methods and apparatuses for aperiodically feeding back channel state information.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DETAILED DESCRIPTION OF THE INVENTION

Technical Problems

3rd Generation Partnership Project (3GPP) Long Term Evolution (LTE) Rel-8 system (hereinafter, LTE system) uses a Multi-Carrier Modulation (MCM) scheme in which one Component Carrier (CC) is divided into multiple bandwidths. However, a 3GPP LTE-Advanced system (hereinafter, LTE-A system) may use a Carrier Aggregation (CA) scheme in which one or more CCs are aggregated in order to support a system bandwidth broader than a bandwidth of the LTE system.

Namely, since the LTE system does not configure a plurality of downlink (DL) CCs and/or uplink (UL) CCs, if a User Equipment (UE) is requested to perform feedback, there is no ambiguity about for which CC feedback is to be performed. In the LTE-A system, however, since a plurality of CCs may be allocated to the UE in a CA situation in which a plurality of DL/UL CCs is aggregated, it is not certain for which CC or serving cell feedback is to be performed upon occurrence of an aperiodic feedback request.

An object of the present invention devised to solve the above-described problem is to provide an efficient feedback method.

Another object of the present invention is to provide a method for implicitly or explicitly designating a DL CC or a serving cell for which feedback is performed, when channel state information is aperiodically fed back.

Still another object of the present invention is to provide definition of a UE behavior about for which DL CC a UE should report feedback information to an eNB in a CA environment in which a plurality of DL CCs may be present.

It will be appreciated by persons skilled in the art that that the technical objects that can be achieved through the present invention are not limited to what has been particularly described hereinabove and other technical objects of the present invention will be more clearly understood from the following detailed description.

Technical Solutions

The present invention discloses various methods and apparatuses for aperiodically feeding back channel state information in a wireless access system supporting CA technology.

In one aspect of the present invention, a method for a User Equipment (UE) to aperiodically feed back Channel State Information (CSI) in a wireless access system supporting multicarrier aggregation includes receiving a first message including an aperiodic CSI request field and an uplink (UL) grant from a Base Station (BS), receiving a second message including bitmap information indicating a downlink (DL) Component Carrier (CC) for which the CSI is to be measured, from the BS, measuring the CSI in consideration of one or more of the aperiodic CSI request field, the UL grant, and the bitmap information, and transmitting the measured CSI to the BS through a Physical Uplink Shared Channel (PUSCH) to aperiodically feed back the measured CSI.

In another aspect of the present invention, a method for a Base Station (BS) to aperiodically receive feedback Channel State Information (CSI) in a wireless access system supporting multicarrier aggregation includes transmitting a first message including an aperiodic CSI request field and an uplink (UL) grant to a User Equipment (UE), transmitting a second message including bitmap information indicating a downlink (DL) Component Carrier (CC) for which the CSI is to be measured, to the UE, and aperiodically receiving the CSI measured in consideration of one or more of the aperiodic CSI request field, the UL grant, and the bitmap information through a Physical Uplink Shared Channel (PUSCH).

In a further aspect of the present invention, a User Equipment (UE) for aperiodically feeding back Channel State Information (CSI) in a wireless access system supporting multicarrier aggregation includes a reception module for receiving a radio signal, a transmission module for transmitting the radio signal, and a processor for controlling aperiodic feedback of the CSI, wherein the processor receives, using the reception module from a Base Station (BS), a Physical Downlink Control Channel (PDCCH) signal including an aperiodic CSI request field and an uplink (UL) grant and a radio resource control signal including bitmap information indicating a downlink (DL) Component Carrier (CC) for which the CSI is to be measured, measures the CSI in consideration of one or more of the aperiodic CSI request field, the UL grant, and the bitmap information, and transmits the measured CSI to the BS using the transmission module through a Physical Uplink Shared Channel (PUSCH) to aperiodically feed back the CSI.

The UE may measure the CSI for one or more DL CCs indicated by the bitmap information, when the aperiodic CSI request field indicates that the CSI is to be measured for the DL CCs indicated by the bitmap information included in the second message.

The first message may be a Physical Downlink Control Channel (PDCCH) signal and the second message is a radio resource control signal of a higher layer signal.

The first message may be transmitted through a UE-specific Search Space (USS) or a Common Search Space (CSS).

In the aspects of the present invention, if the aperiodic CSI request field indicates that the CSI is to be measured for a DL CC linked with a System Information Block 2 (SIB2), the UE may measure the CSI for the DL CC.

The above aspects of the present invention are merely some parts of the exemplary embodiments of the present invention and other embodiments into which the technical features of the present invention are incorporated can be derived and understood by those skilled in the art from the detailed description of the present invention which follows.

Advantageous Effects

The embodiments of the present invention have the following effects.

First, a UE can efficiently feed back channel state information to an eNB.

Second, when a UE aperiodically feeds back channel state information, an eNB explicitly or implicitly designates a DL CC or a serving cell for which feedback is performed and thus the UE can certainly discern for which DL CC or a serving cell channel quality measurement is to be performed.

It will be appreciated by persons skilled in the art that that the effects that can be achieved through the present invention are not limited to what has been particularly described hereinabove and other advantages of the present invention will be more clearly understood from the following detailed description.

BEST MODE FOR CARRYING OUT THE INVENTION

Figure 1:
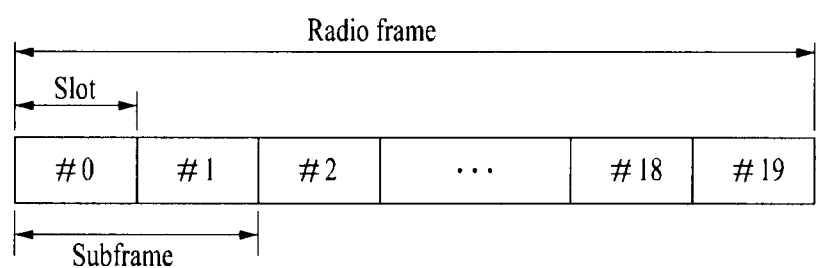
FIG. 1 is a diagram illustrating a radio frame structure which can be used in embodiments of the present invention.

The embodiments of the present invention disclose various methods for transmitting and receiving a contention-based UL channel signal and apparatuses supporting the same.

The embodiments of the present invention described below are combinations of elements and features of the present invention in a predetermined form. The elements or features are considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions or features of another embodiment.

In the description of the attached drawings, procedures or steps will be omitted when it may obscure the subject matter of the present invention. In addition, procedures or steps that could be understood by those skilled in the art will not be described either.

In the embodiments of the present invention, a description is given of data transmission and reception between a BS and a terminal. Here, the BS refers to a terminal node of a network, which directly communicates with the terminal. In some cases, a specific operation described as being performed by the BS may be performed by an upper node of the BS.

Namely, it is apparent that, in a network comprised of a plurality of network nodes including a BS, various operations performed for communication with a terminal may be performed by the BS, or network nodes other than the BS. The term 'BS' may be replaced with terms such as fixed station, Node B, eNode B (eNB), Advanced Base Station (ABS), access point, etc.

The term 'terminal' may be replaced with terms such as User Equipment (UE), Mobile Station (MS), Subscriber Station (SS), Mobile Subscriber Station (MSS), mobile terminal, Advanced Mobile Station (AMS), etc.

A transmitter is a fixed and/or mobile node that provides a data service or a voice service and a receiver is a fixed and/or mobile node that receives a data service or a voice service. Therefore, in UL, an MS may serve as a transmitter and a BS may serve as a receiver. Similarly, in DL, the MS may serve as a receiver and the BS may serve as a transmitter.

The embodiments of the present invention can be supported by standard documents disclosed in at least one of wireless access systems including an Institute of Electrical and Electronic Engineers (IEEE) 802.xx system, a 3rd Generation Partnership Project (3GPP) system, a 3GPP LTE system, and a 3GPP2 system. Especially, the embodiments of the present invention can be supported by 3GPP TS 36.211, 3GPP TS 36.212, 3GPP TS 36.213, and 3GPP TS 36.321 documents. That is, obvious steps or portions that are not described in the embodiments of the present invention can be explained with reference to the above documents. In additional, for description of all terms used herein, reference can be made to the above standard documents.

Reference will now be made in detail to the exemplary embodiments of the present invention in conjunction with the accompanying drawings. The detailed description, which will be given below with reference to the accompanying drawings, is intended to explain exemplary embodiments of the present invention, rather than to show the only embodiments that can be implemented according to the invention.

In addition, specific terms used in the embodiments of the present invention are provided to aid in understanding of the present invention and those terms may be changed without departing from the spirit of the present invention.

The following technology can be used for a variety of radio access systems, for example, Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA) systems.

CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as IEEE 802.11 (Wi-Fi), IEEE 802.16 (WiMax), IEEE 802-20, and Evolved UTRA (E-UTRA).

UTRA is a part of the Universal Mobile Telecommunications System (UMTS). 3GPP Long Term Evolution (LTE) is a part of Evolved UMTS (E-UMTS) employing E-UTRA and uses OFDMA in DL and SC-FDMA in UL. An LTE-Advanced (LTE-A) system is an evolved version of a 3GPP LTE system. To clarify description of technical features of the present invention, although 3GPP LTE/LTE-A is mainly described, the technical sprit of the present invention may be applied to IEEE 802.16e/m systems.

1. Basic Structure of 3GPP LTE/LTE-A System

FIG. 1 is a diagram illustrating a radio frame structure which can be used in embodiments of the present invention.

A radio frame includes 10 subframes and each subframe includes two slots. A time for transmitting one subframe is defined as a Transmission Time Interval (TTI). One subframe has a length of 1 ms and one slot has a length of 0.5 ms.

One slot includes a plurality of Orthogonal Frequency Division Multiplexing (OFDM) symbols in the time domain and a plurality of Resource Blocks (RBs) in the frequency domain. The OFDM symbol represents one symbol period in a 3GPP LTE system using an Orthogonal Frequency Division Multiplexing Access (OFDMA) scheme in DL. That is, the OFDM symbol may be called an SC-FDMA symbol or symbol period according to a multiple access scheme. An RB is a resource allocation unit and includes a plurality of consecutive subcarriers per slot.

The radio frame structure shown in FIG. 1 is purely exemplary and various modifications may be made in the number of subframes included in a radio frame, the number of slots included in a subframe, and the number of OFDM symbols included in a slot.

Figure 2:
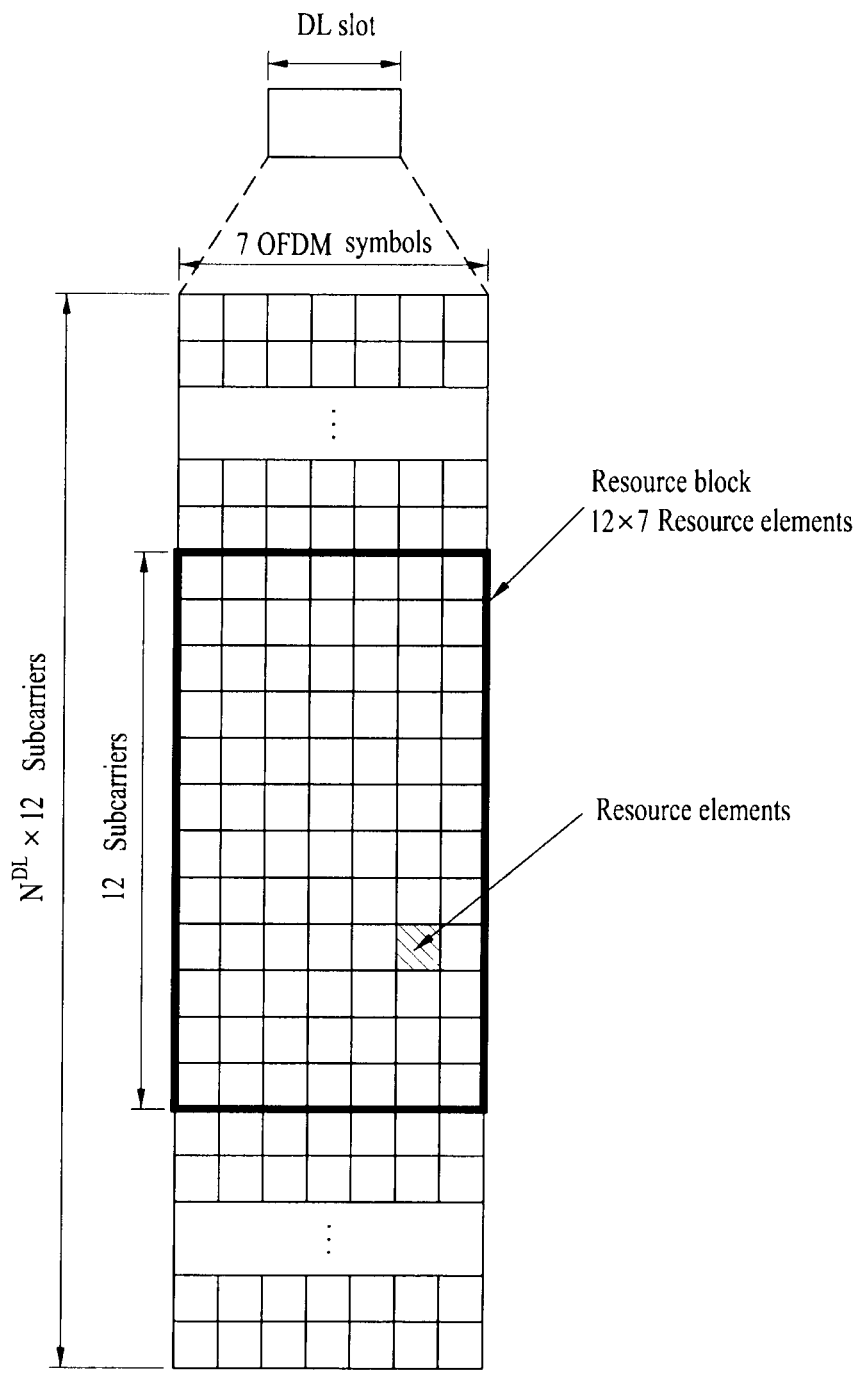
FIG. 2 is a diagram illustrating a resource grid for one DL slot which can be used in embodiments of the present invention.

FIG. 2 is a diagram illustrating a resource grid for one DL slot which can be used in embodiments of the present invention.

A DL slot includes a plurality of OFDM symbols in the time domain. In the illustrated example of FIG. 2, one DL slot includes 7 OFDM symbols and one RB includes 12 subcarriers in the frequency domain.

Each element on a resource grid is referred to as a Resource Element (RE). One RB includes 12×7 REs. The number of RBs included in a DL slot, $N^{DL}$, depends on DL transmission bandwidth configured in a cell.

Figure 3:
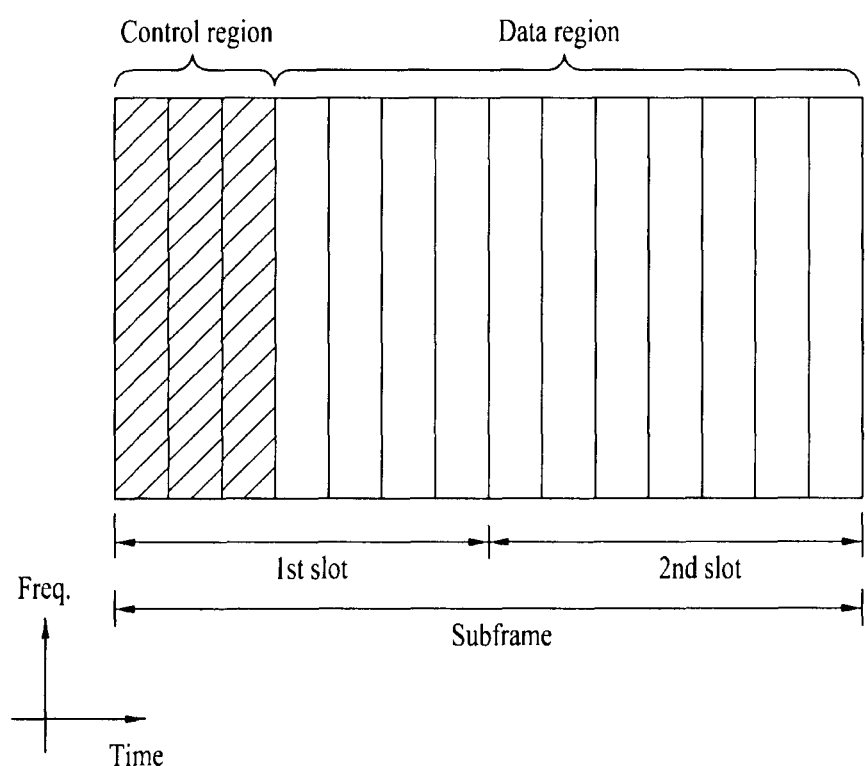
FIG. 3 is a diagram illustrating a DL subframe structure which can be used in embodiments of the present invention.

FIG. 3 is a diagram illustrating a DL subframe structure which can be used in embodiments of the present invention.

A subframe includes two slots in the time domain. A maximum of 3 OFDM symbols in the front portion of the first slot in a subframe corresponds to a control region to which control channels are allocated and the remaining OFDM symbols correspond to a data region to which a Physical Downlink Shared Channel (PDSCH) is allocated.

DL control channels used in a 3GPP LTE system include a Physical Control Format Indicator Channel (PCFICH), a Physical Downlink Control Channel (PDCCH), and a Physical Hybrid-ARQ Indicator Channel (PHICH). A PCFICH signal transmitted on the first OFDM symbol of a subframe carries information about the number of OFDM symbols (i.e. the magnitude of the control region) used for control channel signal transmission in the subframe. The PHICH carries an Acknowledgment/Negative-Acknowledgment (ACK/NACK) signal for a UL Hybrid Automatic Repeat Request (HARQ). In other words, the ACK/NACK signal for UL data transmitted by a UE is transmitted over the PHICH.

DL control information transmitted through the PDCCH is referred to as Downlink Control Information (DCI). The DCI includes resource allocation information for a UE or a UE group and includes other control information. For example, the DCI may include UL resource allocation information, DL resource allocation information, a UL transmit power control command, etc.

The PDCCH may carry a transmission format and resource allocation information for a Downlink Shared Channel (DL-SCH), a transmission format and resource allocation information for an Uplink Shared Channel (UL-SCH), paging information on a Paging Channel (PCH), system information on the DL-SCH, resource allocation information for a higher-layer control message such as a random access response transmitted on the PDSCH, a transmit power control command set for individual UEs in a UE group, a transmit power control command, information about activation of a Voice over Internet Protocol (VoIP), and the like.

A plurality of PDCCHs may be transmitted in one control region. A UE may monitor a plurality of PDCCHs. The PDCCH is transmitted on one or more consecutive Control Channel Elements (CCEs). A CCE is a logical allocation unit used to provide the PDCCH with a coding rate based on a radio channel state. The CCE corresponds to a plurality of Resource Element Groups (REGs). A format of the PDCCH and the number of available bits of the PDCCH are determined according to the correlation between a code rate provided in the CCE and the number of CCEs. An eNB determines the PDCCH format according to DCI to be transmitted to a UE and attaches a Cyclic Redundancy Check (CRC) to control information.

The CRC is masked together with a Radio Network Temporary Identifier (RNTI) according to the usage method or owner of the PDCCH. If the PDCCH is dedicated to a specific UE, an identifier of the UE (e.g. cell-RNTI (C-RNTI)) is masked to the CRC. If the PDCCH is dedicated to a paging message, a paging identifier (e.g. paging-RNTI (P-RNTI)) is masked to the CRC. If the PDCCH is for system information (especially, a system information block), a system information identifier and a system information RNTI (S-RNTI) may be masked to the CRC. A Random Access RNTI (RA-RNTI) may be masked to the CRC in order to indicate a random access response to reception of a random access preamble of a UE.

In a CA environment, a PDCCH may be transmitted through one or more CCs and include resource allocation information for one or more CCs. For example, although the PDCCH is transmitted through one CC, the PDCCH may include resource allocation information for one or more PDSCHs and PUSCHs.

Figure 4:
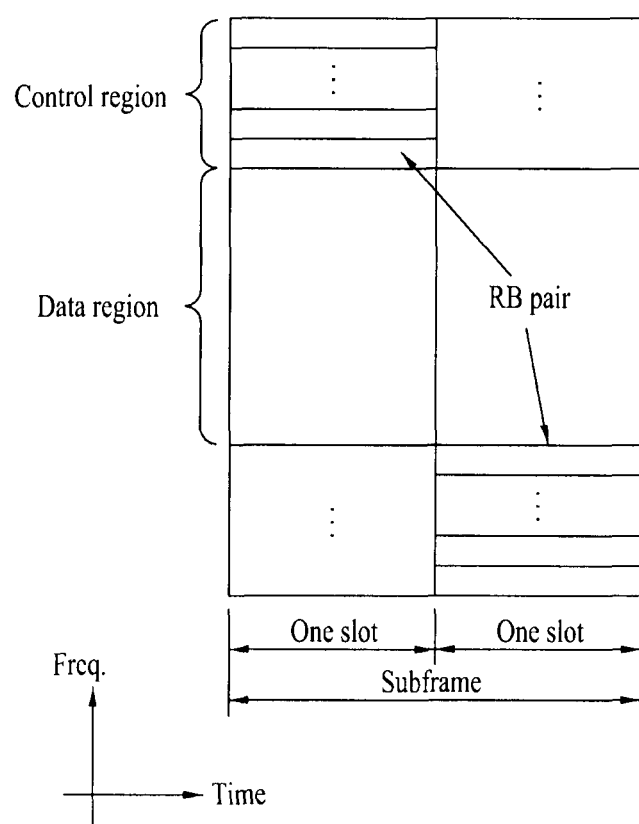
FIG. 4 is a diagram illustrating a UL subframe structure which can be used in embodiments of the present invention.

FIG. 4 is a diagram illustrating a UL subframe structure which can be used in embodiments of the present invention;

Referring to FIG. 4, a UL subframe includes plural (e.g. two) slots. Each slot may include a different number of SC-FDMA symbols according to the length of a Cyclic Prefix (CP). The UL subframe is divided into a data region and a control region in the frequency domain. The data region includes a Physical Uplink Shared Channel (PUSCH) and is used to transmit data signals including voice information. The control region includes a PUCCH and is used to transmit Uplink Control Information (DCI). The PUCCH includes an RB pair located at both ends of the data region in the frequency domain and is hopped using the slot as a boundary.

In an LTE system, a UE does not simultaneously transmit a PUCCH signal and a PUSCH signal in order to maintain a single carrier property. Nonetheless, in an LTE-A system, the PUCCH signal and the PUSCH signal may be simultaneously transmitted in the same subframe according to a transmission mode of a UE and the PUCCH signal may be piggybacked on the PUSCH signal during transmission.

A PUCCH for one UE is allocated in an RB pair in a subframe and RBs belonging to the RB pair occupy different subcarriers in two respective slots. Thus, the RB pair allocated to the PUCCH is frequency-hopped at a slot boundary.

The PUCCH may be used to transmit the following control information.

Scheduling Request (SR): SR is used for requesting UL-SCH resources and is transmitted using an On-Off Keying (OOK) scheme.

HARQ ACK/NACK: HARQ ACK/NACK is a response signal to a PDCCH indicating a DL data packet or Semi-Persistent Scheduling (SPS) release on a PDSCH. HARQ ACK/NACK indicates whether or not the PDCCH indicating the DL data packet or SPS release has been successfully received. A 1-bit ACK/NACK is transmitted as a response to a single DL codeword and a 2-bit ACK/NACK is transmitted as a response to two DL codewords. In the case of TDD, ACK/NACK responses to a plurality of DL subframes are gathered and transmitted on one PUCCH through bundling or multiplexing.

Channel Quality Indicator (CQI) or Channel State Information (CSI): CQI or CSI is feedback information for a DL channel. Multiple Input Multiple Output (MIMO)-associated feedback information includes a Rank Indicator (RI) and a Precoding Matrix Indicator (PMI). 20 bits are used per subframe. In the embodiments of the present invention, CSI may be interpreted as including all of CQI, RI, and PMI.

The amount of UCI that can be transmitted in a subframe by a UE is dependent upon the number of SC-FDMA symbols available for UCI transmission. The SC-FDMA symbols available for UCI transmission indicate the remaining SC-FDMA symbols other than SC-FDMA symbols that are used for reference signal transmission in a subframe. In the case of a subframe in which a Sounding Reference Signal (SRS) is configured, the last SC-FDMA symbol of the subframe is also excluded. The reference signal is used for coherent detection of a PUCCH. The PUCCH supports 7 formats according to transmitted information.

Table 1 shows the mapping relationship between PUCCH and UCI for use in LTE.

TABLE 1

| PUCCH Format | UCI |
|---|---|
| Format 1 | Scheduling request (SR) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK for extended CP |
| Format 2a | CQI and 1-bit HARQ ACK/NACK |
| Format 2b | CQI and 2-bit HARQ ACK/NACK |

2. Multicarrier Aggregation Environment (1) Overview

A communication environment considered in the embodiments of the present invention includes all environments supporting multicarrier aggregation. That is, a multicarrier system or a carrier aggregation system used in the present invention refers to a system configuring a target wideband by aggregating more than one carrier having a bandwidth narrower than a target bandwidth in order to support a wideband.

In the present invention, multiple carriers indicate aggregation of CCs (or CA). In this case, CA refers to not only aggregation of contiguous carriers but also aggregation of non-contiguous carriers. Multicarrier aggregation is interchangeably used with the term CA or bandwidth aggregation.

In an LTE-A system, the goal of multicarrier aggregation (i.e. CA) in which two or more CCs are aggregated is to support up to a bandwidth of 100 MHz. When more than one carrier having a bandwidth narrower than a target bandwidth is aggregated, the bandwidth of each aggregated carrier may be restricted to a bandwidth used in a legacy system in order to maintain backward compatibility with a legacy IMT system.

For example, a legacy 3GPP LTE system may support bandwidths of {1.4, 3, 5, 10, 15, 20} MHz and a 3GPP LTE-A system may support a bandwidth wider than 20 MHz, using only the above bandwidths supported in the LTE system. A multicarrier system used in the present invention may support CA by defining a new bandwidth irrespective of the bandwidths used in the legacy system.

FIG. 5 is a diagram explaining a multiband Radio Frequency (RF) based signal transmission and reception method used in an LTE system.

Figure 5A:
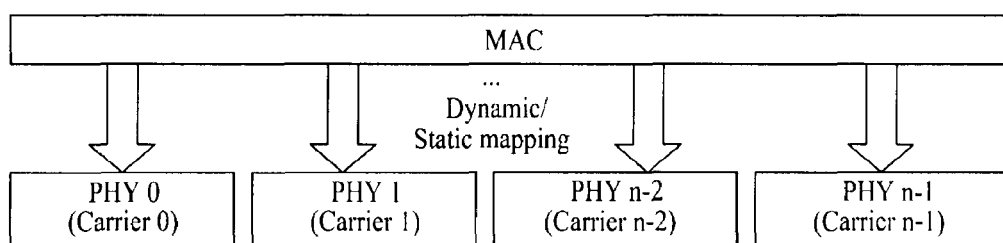
FIGS. 5(a) and (b) are diagrams explaining a multiband Radio Frequency (RF) based signal transmission and reception method used in an LTE system.

In FIG. 5(a), one Medium Access Control (MAC) layer of a transmitter and a receiver may manage a plurality of carriers in order to efficiently use multiple carriers. To effectively transmit and receive multiple carriers, it is assumed that both the transmitter and the receiver are capable of transmitting and receiving the multiple carriers.

Frequency Carriers (FCs) managed by one MAC layer are flexible in terms of resource management because they need not be contiguous. That is, it is possible to configure both contiguous carrier aggregation and non-contiguous carrier aggregation.

Figure 5B:
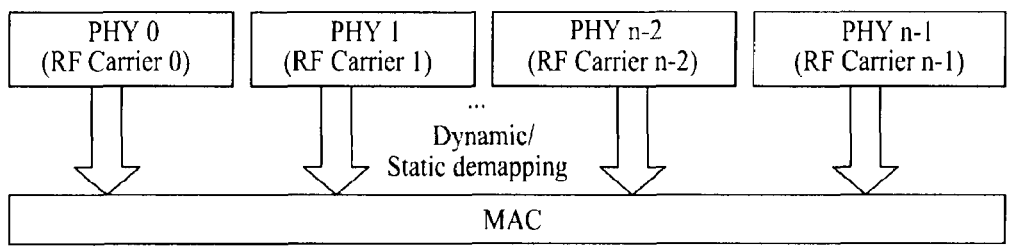

In FIG. 5(a) and FIG. 5(b), PHY0, PHY1, ... PHY n-2, and PHY n-1 indicate multiple bands according to this technology and each band may have a Frequency Allocation (FA) size allocated for a specific service according to a predetermined frequency policy. For example, PHY0 (RF carrier 0) may have an FA size allocated for a general FM radio broadcast and PHY1 (RF carrier 1) may have an FA size allocated for mobile phone communication.

To transmit signals through multiple bands as illustrated in FIG. 5(a) and to receive signals through multiple bands as illustrated in FIG. 5(b), each of the transmitter and the receiver needs to include an RF module for transmitting and receiving signals through multiple bands. In FIG. 1 (FIG. 5??), a method of configuring MAC is determined by an eNB irrespective of DL or UL.

In brief, this technology is a signal transmission/reception technology in which one MAC entity (hereinafter, simply referred to as "MAC" unless such use causes confusion) manages/operates a plurality of RF carriers (or radio frequencies). RF carriers managed by one MAC need not be contiguous. Therefore, this technology has an advantage of high flexibility in terms of resource management.

FIG. 6 illustrates an exemplary method for managing a plurality of carriers in a plurality of MAC layers in an LTE system.

Figure 6A:
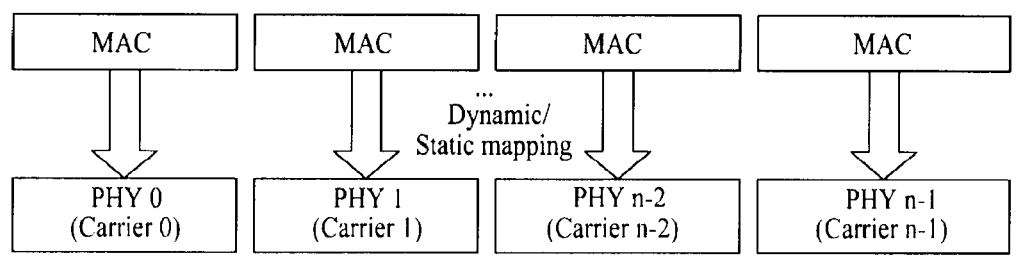
FIGS. 6(a) and (b) illustrate an exemplary method for managing a plurality of carriers in a plurality of MAC layers in an LTE system.
Figure 6B:
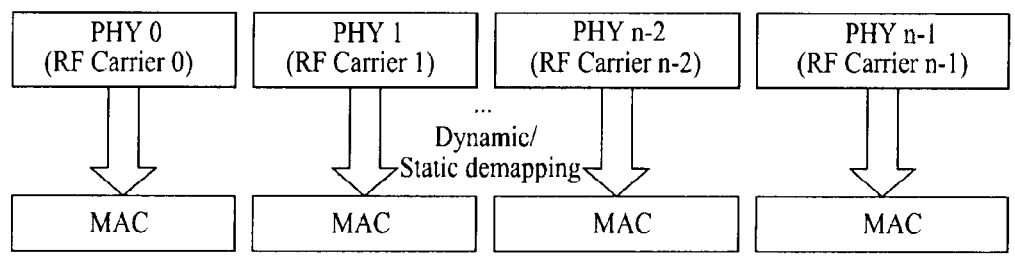

FIG. 6(a) illustrates a one-to-one mapping relationship between MAC layers and Physical (PHY) layers, when a transmitter (e.g. an eNB) supports multiple carriers, and FIG. 6(b) illustrates a one-to-one mapping relationship between MAC layers and PHY layers, when a receiver (e.g. a UE) supports multiple carriers. One PHY layer may use one carrier.

FIG. 7 illustrates an exemplary method for managing one or more carriers in a single MAC layer in an LTE system.

In FIG. 7, one MAC layer may be mapped independently to one PHY layer for each of specific carriers (e.g. carrier 0 and carrier 1) or one MAC layer may be mapped to PHY layers for specific carriers (e.g. carrier n-1 (??n-2) and carrier n-1). If this hybrid mapping scheme is used, some carriers for which one MAC layer is mapped to a plurality of PHY layers may be multiplexed in the method of FIG. 6 (??FIG. 5).

Figure 7A:
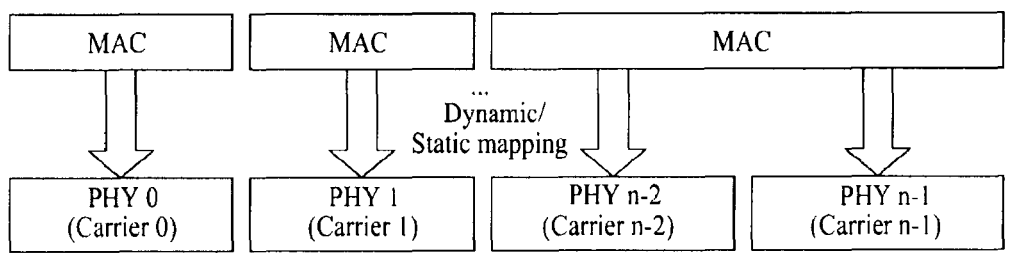
FIGS. 7(a) and b illustrate an exemplary method for managing one or more carriers in a single MAC layer in an LTE system.
Figure 7B:
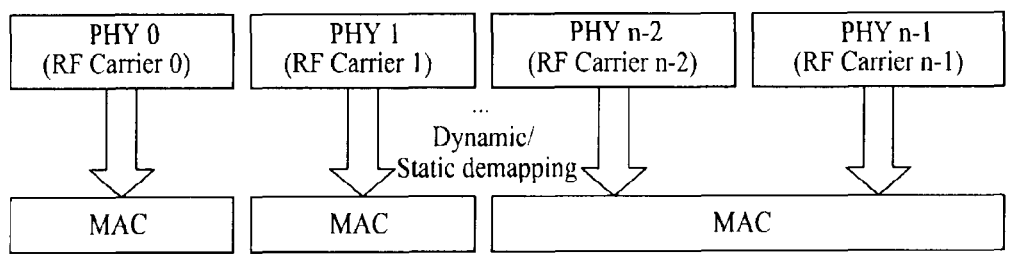

Referring to FIG. 7, FIG. 7(a) illustrates a one-to-one or one-to-m (m>1) mapping relationship between MAC layers and PHY layers, when a transmitter (e.g. an eNB) supports multiple carriers. FIG. 7(b) illustrates a one-to-one or one-to-m mapping relationship between MAC layers and PHY layers, when a receiver (e.g. a UE) supports multiple carriers.

In a system supporting multiple carriers, different UEs may use different carriers according to the capabilities of an eNB and the UEs. Notably, the carrier band support capabilities of the eNB may be constantly fixed. The eNB may negotiate with the UEs to determine whether to support carriers during call setup according to the capabilities of the eNB.

A TDD system is configured to operate N carriers each including DL and UL transmissions. An FDD system is configured to use a plurality of carriers in each of UL and DL. In an LTE Rel-8 system, while the bandwidths of carriers in UL and DL may be different from each other, transmission and reception in a single carrier is basically supported. However, in an LTE-A system, a plurality of carriers may be operated through CA. Furthermore, the FDD system may support asymmetrical CA in which the numbers of aggregated carriers/the bandwidths of aggregated carriers in UL and DL are different from each other.

An LTE-A UE disclosed in the present invention may simultaneously monitor RF signals on one or more CCs according to capabilities thereof. However, an LTE UE (e.g. an LTE Rel-8 UE) may transmit and receive RF signals only on one CC according to the structure of a CC provided in the LTE Rel-8 system. All CCs of LTE Rel-8 should be compatible with each other, at least when the numbers of aggregated CCs in UL and DL are the same. Consideration of non-compatible configurations of LTE-A CCs is not precluded.

L1 (PHY) specification should support CA for contiguous and non-contiguous CCs each including a maximum of 110 RBs using LTE Rel-8 numerology. For details of a frequency spacing between contiguous carriers in contiguous CA, reference may be made to RAN WG4 specification. The RAN WG4 specification provides details of the number of RBs supported per CC and guard bands necessary for specific CA. If possible, it is desirable to apply the details of the RAN WG4 specification to the L1 specification for contiguous CA and non-contiguous CA.

A UE may be configured to support multiple carriers aggregated by a different number of CCs so as to have different bandwidths in UL and DL. In a typical TDD deployment, the bandwidths of CCs and the numbers of CCs in DL and UL may be the same. RAN WG 4 will study combinations of aggregated CCs and bandwidths.

From a UE perspective, one transport block without spatial multiplexing and one HARQ entity per scheduled CC may be considered. Each transport block may be mapped only to a single CC. The UE may be simultaneously scheduled on a plurality of CCs.

(2) Compatibility of LTE-A System

In an LTE-A system, there is a backward compatible carrier which supports a legacy system (e.g. an LTE system). The backward compatible carrier should be accessible by UEs of all LTE releases. The backward compatible carrier can be operated as a single carrier or a part of multiple carriers (CA). In FDD, the backward compatible carrier always occurs in pairs in DL and UL.

In the LTE-A system, there is a non-backward compatible carrier which does not support the legacy system. Legacy LTE UEs are unable to use the non-backward compatible carrier but LTE-A UEs may use the non-backward compatible carrier. The non-compatible carrier can be operated as a single carrier from the duplex distance and, otherwise, can be operated as a part of CA.

The LTE-A system can support an extension carrier. The extension carrier cannot be operated as a single carrier. However, if at least one carrier in a set of CCs is a single carrier, the extension carrier is operated as a part of the set of CCs.

(3) Cell-Specific Linkage and UE-Specific Linkage

In CA, one or more carriers are used for two methods of cell-specific linkage and UE-specific linkage. In the present invention, the term "cell-specific linkage" refers to CA from the perspective of a cell or an eNB and is expressed by the term "cell-specific" for convenience. If a cell means one backward or non-backward compatible carrier, the term "cell-specific" may be used to signify one or more carriers or resources (managed by a certain eNB) including one carrier represented by a cell.

Cell-specific DL/UL linkage may be a form of CA configured by an eNB or a cell. In the cell-specific DL/UL linkage, DL and UL linkage may be determined according to preset default Tx-Rx separation defined in the LTE Rel-8 system and/or the LTE-A system, in case of FDD. As an example, for default Tx-Rx separation of the LTE Rel-8 system, reference may be made to sections 5.7.3 and 5.7.4 of 3GPP TS 36.101 V8.8.0. If Tx-Rx separation only for the LTE-A system is defined, the cell-specific DL/UL linkage may be defined according to the corresponding linkage. For default Tx-Rx separation of the LTE-A system, reference may be made to sections 5.7.3 and 5.7.4 of 3GPP TS 36.101 V10.0.0.

UE-specific multicarrier (UE-specific DL/UL linkage) refers to configuring a CA type for use in a specific UE or UE group using an arbitrary method (e.g. UE capabilities, negotiation, signaling, and/or broadcasting, etc.) between a UE and an eNB. For example, UE-specific DL/UL linkage defined in the LTE-A system includes a UE DL CC set and a UE UL CC set. The UE DL CC set, which is a set of DL CCs configured by dedicated signaling, is scheduled for reception of a PDSCH in DL. The UE UL CC set is scheduled on UL CCs to transmit a PUSCH in UL. In UE-specific DL/UL linkage, CC sets such as a PDCCH monitoring set and a measurement set may be defined.

The PDCCH monitoring set may be configured in a UE DL CC set separately from a UE DL/UL CC set, in a form including a part of the UE DL CC set, or on CCs different from the UE DL CC set. The PDCCH monitoring set may be UE-specifically or cell-specifically configured.

The measurement set increases according to the number of carriers with which a measurement result that a UE should report is aggregated as CA is introduced. The measurement set may be defined to reduce such report overhead or to effectively support measurement according to capabilities of each UE.

The UE-specific DL/UL linkage may be configured (1) irrespective of cell-specific DL/UL linkage or (2) within a range for maintaining the structure of cell-specific DL/UL linkage, in terms of flexibility.

As described above, the LTE-A system uses the concept of a cell to manage radio resources. The cell is defined as a combination of a DL resource and a UL resource and the UL resource may be selectively defined. Accordingly, the cell may be configured by the DL resource alone or by the DL resource and the UL resource. When multiple carriers (i.e. CA) are supported, the linkage between the carrier frequency (or DL CC) of the DL resource and the carrier frequency (or UL CC) of the UL resource may be indicated by system information.

A cell used in the LTE-A system includes a Primary cell (PCell) and a Secondary cell (SCell). The PCell may refer to a cell operating on a primary frequency (or primary CC) and the SCell may refer to a cell operating on a secondary frequency (or secondary CC). Notably, only one PCell and one or more SCells may be allocated to a specific UE.

The PCell is used to perform an initial connection establishment procedure or a connection re-establishment procedure. The PCell may refer to a cell indicated during a handover procedure. The SCell can be configured after Radio Resource Control (RRC) connection is established and may be used to provide additional radio resources.

The PCell and SCell may be used as a serving cell. In case of a UE in which CA is not configured or CA is not supported even in an RRC_CONNECTED state, only a single serving cell comprised of only a PCell is present. Meanwhile, in case of a UE in which CA is configured in an RRC_CONNECTED state, one or more serving cells may be present and entire cells include a PCell and one or more SCells.

After an initial security activation procedure is started, an E-UTRAN may configure a network including one or more SCells in addition to an initially configured PCell during a connection establishment procedure. In a multicarrier environment, each of a PCell and an SCell may serve as a CC. Namely, CA may be understood as a combination of a PCell and one or more SCells. In the following embodiments, a Primary CC (PCC) may have the same meaning as a PCell and a Secondary CC (SCC) may have the same meaning as an SCell.

3. MIMO Feedback

A radio access system supporting multicarrier aggregation used in the embodiments of the present invention may also support a MIMO feedback method using two or more input/output antennas.

MIMO feedback information includes a Precoding Matrix Index (PMI), a Rank Indicator (RI), and a Channel Quality Information (CQI) index. The RI is determined from the number of assigned transmission layers and a UE may obtain an RI value from associated DCI. The PMI is defined in TS 36.211. An SINR for each PMI is calculated and the SINR is transformed into capacity. The best PMI may be selected based on the capacity. The CQI represents channel quality and the CQI index indicates channel coding rate and a modulation scheme.

Table 2 shows an exemplary CQI table used in the LTE system.

TABLE 2

| CQI index | Modulation | Coding rate*1024 | Efficiency |
| --- | --- | --- | --- |
| 0 | | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

If MIMO is applied to a system, the number of necessary CQI also varies. A MIMO system generates multiple channels using multiple antennas and thus a plurality of codewords may be used. Accordingly, a plurality of CQI should be used and, in this case, the amount of control information proportionally increases.

A UE selects the highest CQI index from among CQI values with a transport Block Error Rate (BLER) not exceeding 0.1 in a system bandwidth and feeds back the highest CQI to an eNB. MIMO feedback transmission of a CQI-only mode serves to transmit aperiodic CQI through a PUSCH and, in this case, no PUSCH data is transmitted. The eNB may transmit DCI format 0 to the UE in order to request aperiodic CQI.

Figure 8:
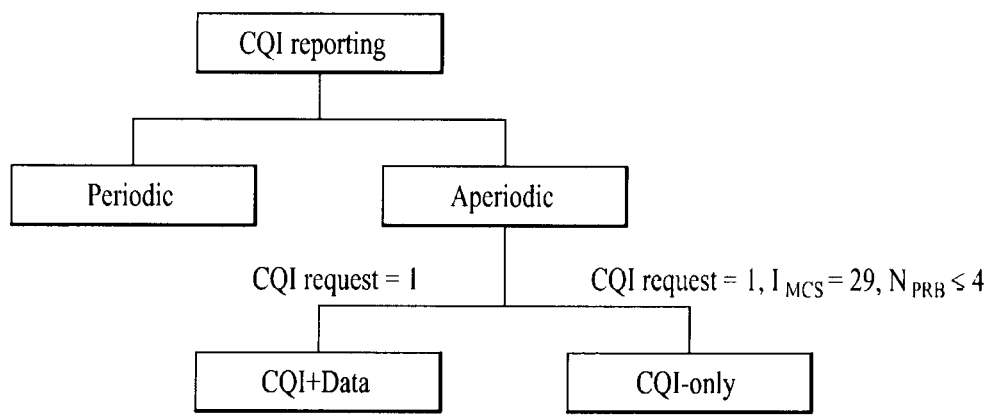
FIG. 8 is a diagram illustrating an exemplary CQI reporting method used in an LTE system.

FIG. 8 is a diagram illustrating an exemplary CQI reporting method used in an LTE system.

Referring to FIG. 8, CQI reporting is divided into periodic reporting and aperiodic reporting. Periodic CQI reporting refers to reporting of channel quality to an eNB from a UE at a predetermined time without additional signaling, whereas aperiodic CQI reporting refers to requesting the UE to report CQI through explicit signaling according to the necessity of a network.

Periodic CQI reporting of the UE is performed through a PUCCH. For periodic CQI reporting of the UE through the PUCCH, the UE should use limited bits compared with CQI reporting through a PUSCH. A recently transmitted RI may be used to calculate wideband CQI/PMI.

If aperiodic CQI reporting is needed, the network signals a UL scheduling grant using DCI format 0 to the UE. The UE performs aperiodic CQI reporting when a CQI request value of DCI format 0 is 1. Aperiodic CQI reporting (i.e. CQI request=1) is divided into a CQI-only (transmission) mode and a CQI+data (transmission) mode.

For example, if the CQI request value is 1, an MCS index IMCS is 29, and the number of allocated Physical Resource Blocks (PRBs) is less than 4 (i.e. NPRB≤4), the UE interprets corresponding signaling as the CQI-only mode and, otherwise, the UE interprets corresponding signaling as the CQI+data mode. In the CQI-only mode, the UE transmits only CSI through the PUSCH without data (i.e. a UL-SCH transport block). On the other hand, in the CQI+data mode, the UE transmits both the CSI and data through the PUSCH. The CQI-only mode may be generalized as a feedback-only mode and the CQI+data mode may be referred to as a feedback+data mode. The CSI includes at least one of CQI, PMI, and RI.

If periodic CQI reporting and aperiodic CQI reporting are scheduled to be simultaneously performed in the same subframe, the UE performs only aperiodic CQI reporting. If data transmission through the PUSCH is scheduled, the same PUCCH based reporting format is used on the PUSCH. RI in a PUCCH reporting mode is independent of RI in a PUSCH reporting mode. RI in the PUSCH reporting mode is valid only for CQI/PMI in the PUSCH reporting mode.

4. Aperiodic Feedback Reporting Method

The LTE system may perform an aperiodic feedback request through two methods. One is a method using a CQI request field included in DCI format 0 and the other is a method using a CQI request field included in a random access grant. In the embodiments of the present invention, the method using the CQI request field of DCI format is explained for convenience of description.

An eNB sets the CQI request field included in DCI format 0 to '1' and transmits a PDCCH signal including the corresponding DCI format 0 to a UE in an n-th subframe. In case of FDD, the UE transmits CQI/RI/PMI feedback to the eNB through a PUSCH signal in an (n+4)-th subframe. In case of TDD, the UE transmits CQI/RI/PMI feedback to the eNB in an (n+k)-th subframe. For k values, reference may be made to Table 8-2 of 3GPP TS 36.213. During aperiodic feedback reporting, a minimum period is one subframe and the size of a subband for CQI may be set to have the same configuration as Tx-Rx configuration.

The UE is configured to set transmission modes for feedback for channel states through higher layer signaling with the eNB in advance. Refer to the following Table 3 for details of the transmission modes for feedback.

TABLE 3

| | | PMI Feedback Type | | |
|---|---|---|---|---|
| | | No PMI | Single PMI | Multiple PMIs |
| PUSCH feedback type | Wideband (wideband CQI) | | | Mode 1-2 |
| | UE Selected (subband CQI) | Mode 2-0 | | Mode 2-2 |
| | Higher layer configured (subband CQI) | Mode 3-0 | Mode 3-1 | |

In Table 3, for a detailed description of each transmission mode, reference may be made to 3GPP TS 36.213. A feedback mode is set in association with a currently configured DL transmission mode and the feedback mode which can be supported according to each DL transmission mode may be summarized as follows.

Transmission mode 1: Modes 2-0, 3-0
Transmission mode 2: Modes 2-0, 3-0
Transmission mode 3: Modes 2-0, 3-0
Transmission mode 4: Modes 1-2, 2-2, 3-1
Transmission mode 5: Mode 3-1
Transmission mode 6: Modes 1-2, 2-2, 3-1
Transmission mode 7: Modes 2-0, 3-0

In order for the UE to transmit UL data and control signals through the PUSCH, the eNB should transmit a UL grant message to the UE through a DL PDCCH. In the LTE system, the eNB transmits a UL grant to the UE through transmission of a PDCCH signal defined as DCI format 0. If a plurality of UL carriers (or serving cells) is present, the eNB may designate a UL CC on which the eNB wishes to transmit a PUSCH signal by including a carrier index value defined in a Carrier Indication Field (CIF) in an information field of DCI transmitted on a PDCCH.

While the CIF may vary with the number of CCs that the CIF should indicate, it is desirable to include the CIF in a predetermined position of a DCI format with a fixed size (e.g. 3 bits) in order to reduce burden on Blind Decoding (BD) upon reception of a PDCCH of the UE.

Figure 9:
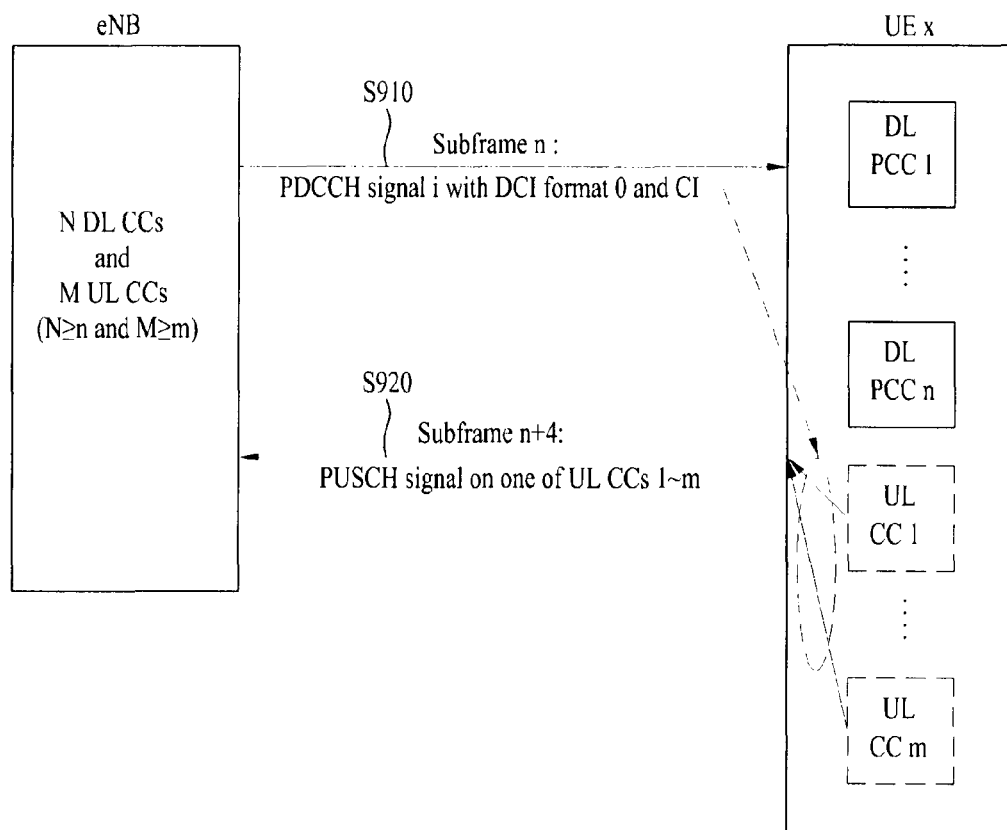
FIG. 9 is a diagram illustrating an exemplary feedback transmission method using a CIF according to an embodiment of the present invention.

FIG. 9 is a diagram illustrating an exemplary feedback transmission method using a CIF according to an embodiment of the present invention.

In FIG. 9, a method for transmitting a PUSCH signal through a CIF in a CA environment is illustrated. A Carrier Indication (CI) value may be UE-specifically defined. For instance, a UE x that is communicating with an eNB comprised of a total of N DL CCs and M UL CCs may have a UE-specific ally configured CC set of n DL CCs and m UL CCs. In this CC set, DL/UL CCs may have UE-specific CI values. If the eNB transmits PDCCH DCI format 0 including one CI value among 1 to m in a subframe n (S910), the UE may transmit a PUSCH signal on a UL CC indicated by the CI value in a subframe n+4 (in case of FDD) (S920).

In FIG. 9, if a corresponding PDCCH i is transmitted with a CQI request set to '1' to the UE, the UE recognizes that a corresponding request is an aperiodic feedback request and may transmit a feedback value to the eNB through the PUSCH signal. In this case, if the UE aperiodically transmits feedback information for one or more DL CCs to the eNB through one specific UL CC, the UE should discern DL CCs and/or UL CCs for which aperiodic feedback is performed. That is, a multicarrier aggregation environment may include a plurality of DL CCs and UL CCs and, therefore, it is necessary to define UE behavior regarding which DL CCs feedback information should be reported to the eNB.

Figure 10:
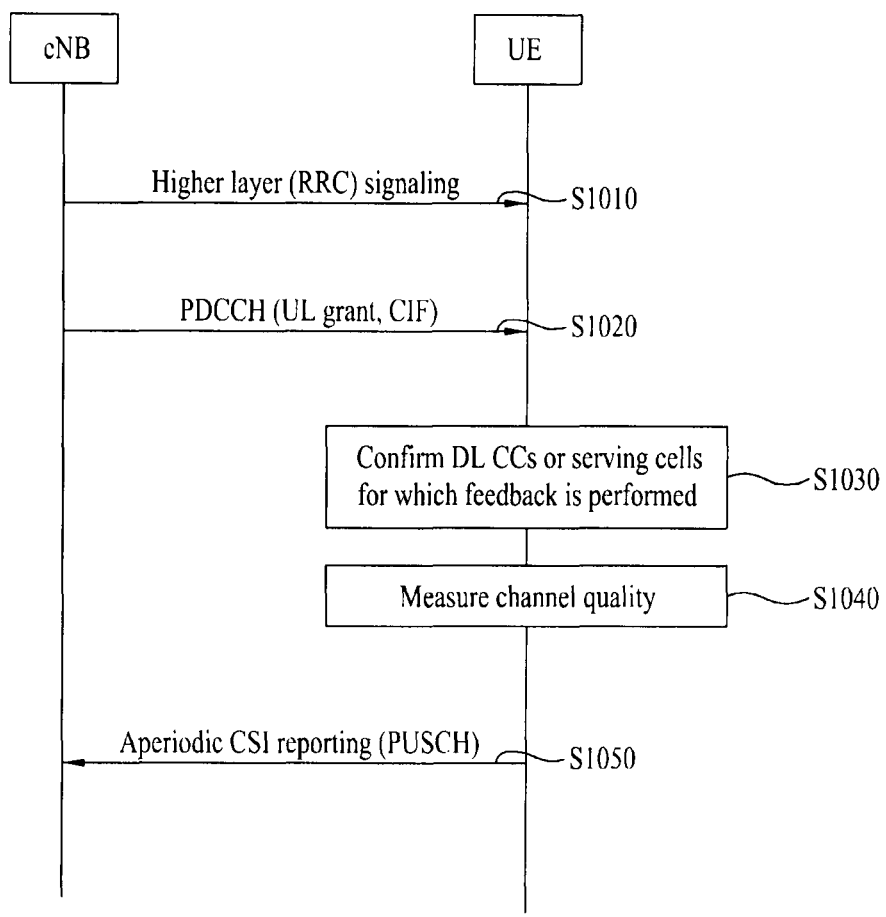
FIG. 10 is a diagram illustrating an aperiodic feedback method of CSI according to the number of DL CCs (or serving cells) for which feedback is performed in a CA environment according to an embodiment of the present invention.

FIG. 10 is a diagram illustrating an aperiodic feedback method of CSI according to the number of DL CCs (or serving cells) for which feedback is performed in a CA environment according to an embodiment of the present invention.

Hereinafter, a method for configuring DL CCs for which feedback is performed according to the number of DL CCs for feedback in a CA environment will be described. An eNB and/or a UE may select one or more DL CCs or serving cells for which CSI feedback is performed.

Referring to FIG. 10, an eNB may inform UEs supporting CA as to whether only one DL CC for which CSI is to be fed back is scheduled or two or more DC CCs for which CSI is to be fed back are scheduled, through higher layer (e.g. RRC) signaling. The eNB may inform the UE of information about the DL CCs according to Quality of Service (QoS) of the UE, CA capabilities, cell load, and/or cross-carrier scheduling/cross-carrier non-scheduling (S1010).

Through step S1010, the UE may obtain in advance information about whether the number of DL CCs (or serving cells) for which CSI measurement is performed is one or more than one and the UE may feed back CSI to the eNB according to a CSI reporting method thereof.

The eNB may inform the UE of DL CCs or serving cells for which aperiodic feedback is to be performed through a UL grant or a CIF included in a PDCCH signal (step S1020).

In step S1020, the DL CCs for which aperiodic feedback is performed may be explicitly or implicitly signaled to the UE and detailed signaling methods will be described later.

The UE may confirm one DL CC or serving cell or two or more DL CCs or serving cells, for aperiodic feedback (S1030) and may measure channel quality for a corresponding DL CC or DL CCs (S1040).

While CSI for one DL CC is transmitted through one PUSCH in an LTE system which does not support CA, CSI for two or more DL CCs may be transmitted in an LTE-A system which supports CA. Accordingly, since it is assumed that the UE in FIG. 10 supports CA, the UE may report CSI for channel quality measured for one or more DL CCs to the eNB using a PUSCH signal (S1050).

In step S1050, in order for the UE to transmit CSI having the increased amount of information according to channel quality measurement for two or more DL CCs, the following two methods may be considered.

The first method is time multiplexing. Time multiplexing is the same concept as cycling and transmits CSI for N DL CCs not in one subframe but in a maximum of N subframes. As the simplest example, CSI for DL CC #0 is transmitted in an n-th subframe, CSI for DL CC #1 is transmitted in an (n+1)-th subframe, and CSI for an N-th DL CC #N is transmitted in an (n+N)-th subframe. At this time, subframes in which CSI is transmitted may be configured continuously or non-continuously with a specific offset. Alternatively, the UE may aperiodically transmit CSI for one or more DL CCs in one subframe through a PUSCH.

The second method is joint coding. Joint coding serves to transmit CSI for one or more DL CCs in one subframe. In this case, the UE may use extended frequency resources for aperiodic CSI reporting and may joint-code CSI for DL CCs to transmit the joint-coded DL CCs through one PUSCH.

In the embodiment of the present invention, step S1010 may be selectively used. If step S1010 is not used, the UE may measure CSI only for DL CCs indicated in step S1020 and report a measurement result to the eNB.

Hereinbelow, methods for configuring and scheduling (1) only one DL CC and (2) two or more DL CCs, for which feedback is performed, in steps S1020 to S1050, will be described.

(1) When Only One DL CC is Configured for Feedback

For example, when only one DL CC is configured for feedback, the target DL CC may be selected as one of ① a DL CC receiving a UL grant including aperiodic CQI report information, ② a DL CC linked with a UL CC on which a PUSCH indicated by a UL grant is to be transmitted through a System Information Block 2 (SIB2), ③ a DL PCC, ④ a DL CC allocated and configured through higher layer (e.g. RRC layer) signaling, and ⑤ a DL CC allocated implicitly for CQI measurement.

Hereinbelow, the above case ② will be described in detail.

The SIB2 may include shared channel information, random access channel information, random access preamble information, and HARQ information. The SIB2 may include information about a UL shared channel (e.g. UL CC) which may be linked with one or more DL CCs.

A DL heavy case in which a plurality of DL CCs is allocated to one UL CC has a disadvantage of feeding back only CSI for only one DL CC, if the number of DL CCs having SIB2 linkage with a UL CC is one and the SIB2 linked DL CC is configured for CSI feedback. Accordingly, in this case, it is desirable that another DL CC be configured for feedback in addition to the SIB2 linked DL CC.

As a first example, when the eNB transmits a UL grant including a CIF to the UE, the eNB may use the CIF to indicate a DL CC for feedback rather than a UL CC. Since this case corresponds to a DL heavy case, only one UL CC is present. Accordingly, the UE may feed back CSI for one of an SIB2 linked DL CC and a DL CC indicated by the CIF to the eNB through the PUSCH.

As a second example, when the eNB transmits a UL grant including a CIF to the UE, the eNB may use the CIF to indicate a DL CC for feedback. That is, the UE may report CSI for a DL CC adjacent to a DL CC indicated by the CIF to the eNB in a TDD form according to a specific criterion of carrier index order or frequency order (e.g. in ascending/descending order) based on the DL CC indicated by the CIF.

As a third example, the UE may use a hybrid form of the first and second methods.

As a fourth example, a virtual SIB2 linked DL CC may be configured for feedback. For example, a DL CC which has no SIB2 linkage may be configured to have a virtual SIB2 linkage with a UL CC. This virtual SIB2 linkage may be explicitly configured by higher layer (e.g. RRC) signalling or may be implicitly determined. When aperiodic CSI reporting is triggered, the UE may report CSI feedback for SIB2 linked DL CCs or CSI feedback for a DL CC which has virtual SIB2 linkage with a single UL CC to the eNB.

Namely, a DL CC which has no SIB2 linkage may be configured to have virtual SIB2 linkage. Such virtual SIB2 linkage may be indicated to the UE explicitly by higher layer signalling or implicitly. For example, virtual SIB2 linkage may be implicitly indicated in ascending or descending order using carrier index, cell index, CIF order, and/or frequency index from an original SIB2 linked DL CC.

If virtual SIB2 linkage is configured and an aperiodic CSI report is requested, the UE may transmit CSI feedback for one of the original SIB2 linked DL CC and a virtual SIB2 linked DL CC to the eNB. If there is a remaining code point without being used in a CIF included in a UL grant (e.g. if a CIF is 3 bits, up to 8 states can be expressed and, if remaining states or bits are present after setting states for DL/UL CC indication, they may be used for code points), whether to transmit feedback for the original SIB2 linked DL CC or to transmit feedback for the virtual SIB2 linked DL CC may be indicated using the code points. If more states remain in the CIF so as to be used for code points, the eNB may inform the UE of one of the original SIB2 linked DL CC or the virtual SIB2 linked DL CC for which CSI feedback is to be performed.

As described above, when a 3-bit CIF is used to indicate not an SIB2 linked DL CC or UL CC but other DL CCs, a 1-bit CIF may remain. In this case, the eNB may inform the UE using the remaining 1-bit CIF of whether to report CSI feedback for a DL CC indicated by the CIF, to report CSI feedback for an SIB2 linked DL CC, or to report CSI feedback for all DL CCs.

A method for feeding back CSI for ⑤ a DL CC allocated implicitly for CQI measurement will be described below.

If a DL CC which has SIB2 linkage with a UL CC indicated by a UL grant used for an aperiodic CSI request is used for CSI measurement and reporting, the DL CC which has SIB2 linkage with the corresponding UL CC is explicitly used for aperiodic CSI measurement and reporting. However, a DL CC which has no SIB2 linkage with a UL CC cannot perform aperiodic CSI triggering. An implicit rule capable of performing aperiodic CSI triggering for such a DL CC is proposed.

For example, the UE may perform CSI measurement and reporting for a DL CC adjacent to an SIB2 linked DL CC or to a DL CC indicated by a CIF. That is, if aperiodic CSI for specific DL CC #1 is triggered, the eNB and UE may configure a DL CC or serving cell having a carrier index or cell index adjacent to the corresponding DL CC as a DL CC or serving cell for aperiodic CSI measurement and reporting without explicit indication.

In the embodiments of the present invention, an explicit DL CC indicates a DL CC indicated by a carrier index, by a CC index indicated in a CIF, or by a frequency index such as EARFCN. An implicit DL CC for aperiodic CSI reporting may be configured by a DL CC adjacent to the explicit DL CC. For example, if aperiodic CSI reporting is requested for specific DL CC #1, the UE may implicitly perform aperiodic CSI measurement and reporting for DL CC #2 or DL CC #0 adjacent to DL CC #1.

An adjacent DL CC index may be indexed starting from an explicitly indicated CC in the direction of a low CC index or in the direction of a high CC index.

In the above-described methods, the number of implicitly indicated DL CCs for aperiodic CSI triggering is desirably one. In addition to the above-described implicit methods, the eNB may transmit information about DL CCs for aperiodic CSI reporting to each UE through higher layer signaling. For example, the eNB may inform the UE of DL CCs for CSI, a direction indicating an adjacent CC index (e.g. high index order or low index order starting from an indicated DL CC), and the like. This is applicable even when any one of the above-described methods (e.g. a DL CC receiving a UL grant, an SIB2 linked DL CC or DL PCC, etc.) is used.

(2) When Two or More DL CCs are Configured for Feedback

When two or more DL CCs are configured for CSI feedback, the DL CCs for CSI feedback may be selected as one of ① activated DL CCs, ② SIB2 linked DL CCs, ③ DL CCs used for transmission of a UL grant, ④ DL CCs indicated explicitly through higher layer (e.g. RRC layer) signaling, ⑤ all DL CCs, and ⑥ DL CCs allocated implicitly for CQI measurement.

Hereinafter, the above case ② will be described in detail.

A DL heavy case in which a plurality of DL CCs is allocated to one UL CC has a disadvantage of feeding back only CSI for only one DL CC, if the number of DL CCs having SIB2 linkage with a UL CC is one and the SIB2 linked DL CCs are configured for feedback. Accordingly, it is desirable that another DL CC be configured for feedback in addition to the SIB2 linked DL CCs.

As a first example, when the eNB transmits a UL grant including a CIF to the UE, the eNB may use the CIF to indicate a DL CC for feedback rather than a UL CC. Since this case corresponds to a DL heavy case, only one UL CC is present. Accordingly, the UE may feed back CSI for an SIB2 linked DL CC and DL CCs indicated by the CIF to the eNB through a PUSCH.

As a second example, when the eNB transmits a UL grant including a CIF to the UE, the eNB may use the CIF to indicate DL CCs for feedback. That is, the UE may sequentially report CSI for DL CCs to the eNB in a TDD form according to a specific criterion of carrier index order or frequency order (e.g. in ascending/descending order) based on the DL CCs indicated by the CIF.

As a third example, the UE may sequentially report CSI for DL CCs to the eNB in a TDD form according to a specific criterion of carrier index order or frequency order (e.g. in ascending/descending order) based on DL CCs which have SIB2 linkage with a UL CC indicated by a CIF of a UL grant.

That is, if DL CCs which have no SIB2 linked UL CC are present as in the DL heavy case, the UE transmits aperiodic CSI for SIB2 linked DL CCs first at a predetermined time based on the SIB2 linked DL CCs in order to perform aperiodic CSI reporting for the corresponding DL CCs. In addition, the UE may sequentially transmit CSI for the DL CCs in a specific subframe in a TDD form according to a specific criterion of carrier index order, frequency index order, or CIF order.

As a fourth example, the UE may use a hybrid form of the first to third methods.

As a fifth example, virtual SIB2 linked DL CCs may be configured for feedback. For example, virtual SIB2 linked UL CCs may be configured for DL CCs which have no SIB2 linkage. This virtual SIB2 linkage may be explicitly configured by higher layer (e.g. RRC) signalling or may be implicitly determined. When aperiodic CSI reporting is requested, the UE may report CSI feedback for multiple SIB2 linked DL CCs or CSI feedback for DL CCs which have virtual SIB2 linkage with a single UL CC to the eNB.

Namely, DL CCs which have no SIB2 linkage may be configured to have virtual SIB2 linkage. Such virtual SIB2 linkage may be indicated to the UE explicitly by higher layer signalling or implicitly. For example, virtual SIB2 linkage may be implicitly indicated in ascending or descending order of a carrier index, cell index, CIF order, and/or frequency index from original SIB2 linked DL CCs.

If virtual SIB2 linkage is configured and aperiodic CSI reporting is triggered, the UE may transmit CSI feedback not only for the original SIB2 linked DL CCs but also for the virtual SIB2 linked DL CCs to the eNB. If there is a remaining code point without being used in a CIF of a UL grant (e.g. if a CIF is 3 bits, up to 8 states can be expressed and, if remaining states or bits are present after setting states for DL/UL CC indication, they may be used for code points), whether to transmit feedback for the original SIB2 linked DL CCs or to transmit feedback for the virtual SIB2 linked DL CCs may be indicated using the code points. If more states remain in the CIF so as to be used for code points, the eNB may inform the UE of one of the original SIB2 linked DL CCs, virtual SIB2 linked DL CCs, and all DL CCs, for which CSI feedback is to be performed.

As described above, when a 3-bit CIF is used to indicate other DL CCs than SIB2 linked DL CCs or UL CCs, a 1-bit CIF may remain. In this case, the eNB may inform the UE using the remaining 1-bit CIF of whether to report CSI feedback for DL CCs indicated by the CIF, to report CSI feedback for SIB2 linked DL CCs, or to report CSI feedback for all DL CCs.

The eNB may explicitly inform the UE of a plurality of DL CCs for which CSI is aperiodically fed back. For example, the eNB may inform the UE of information about DL CCs necessary for aperiodic CSI reporting through a new field defined in a UL grant. Alternatively, the eNB may explicitly inform the UE of DL CCs through a CIF for the DL CCs. In this case, information about UL CCs on which a PUSCH signal is to be transmitted may be implicitly determined by a CIF or a UL PCC. Alternatively, the eNB may indicate DL CCs for feedback using TPC of another PDCCH. The eNB may explicitly indicate DL CCs for aperiodic CSI feedback through UL signaling such as RRC.

A method for feeding back CSI for ⑥ DL CCs allocated implicitly for CQI measurement will be described below.

If DL CCs which have SIB2 linkage to a UL CCs indicated by a UL grant used for an aperiodic CSI request are configured for CSI measurement and reporting, DL CCs which have SIB2 linkage with the corresponding UL CC are explicitly used for aperiodic CSI measurement and reporting. However, DL CCs which have no SIB2 linkage with the UL CC cannot perform aperiodic CSI triggering. An implicit rule capable of performing aperiodic CSI triggering for such DL CCs is proposed.

For example, the UE may perform CSI measurement and reporting for a DL CC adjacent to an SIB2 linked DL CC or to a DL CC by a CIF. That is, if aperiodic CSI for specific DL CC #1 is triggered, the eNB and UE may configure a DL CC or serving cell having a carrier index or cell index adjacent to the corresponding DL CC as a DL CC or serving cell for aperiodic CSI measurement and reporting without explicit indication.

In the embodiments of the present invention, an explicit DL CC indicates a DL CC indicated by a carrier index, by a CC index indicated in a CIF, or by a frequency index such as EARFCN. An implicit DL CC for aperiodic CSI reporting may be configured by a DL CC adjacent to the explicit DL CC. For example, if aperiodic CSI reporting is triggered for specific DL CC #1, the UE may implicitly perform aperiodic CSI measurement and reporting for DL CC #2 or DL CC #0 adjacent to DL CC #1.

An adjacent DL CC index may be indexed starting from an explicitly indicated CC in the direction of a low CC index or in the direction of a high CC index.

The number of implicitly indicated DL CCs for aperiodic CSI triggering may be two or more. For example, if one DL CC linked with a UL CC on which the UE is to transmit a PUSCH signal is an explicit DL CC for CSI reporting, the UE may perform aperiodic CSI reporting for one DL CC or more DL CCs (e.g. two or more DL CCs) adjacent thereto.

In addition to the above-described implicit methods, the eNB may transmit information about DL CCs for aperiodic CSI reporting to each UE through higher layer signaling. For example, the eNB may inform the UE of the number of DL CCs for CSI, a direction indicating adjacent CC indexes (e.g. high index order or low index order starting from an indicated DL CC), and the like. This is applicable even when any one of the above-described methods (e.g. DL CCs receiving a UL grant, SIB2 linked DL CCs or PCCs, etc.) is used.

Figure 11:
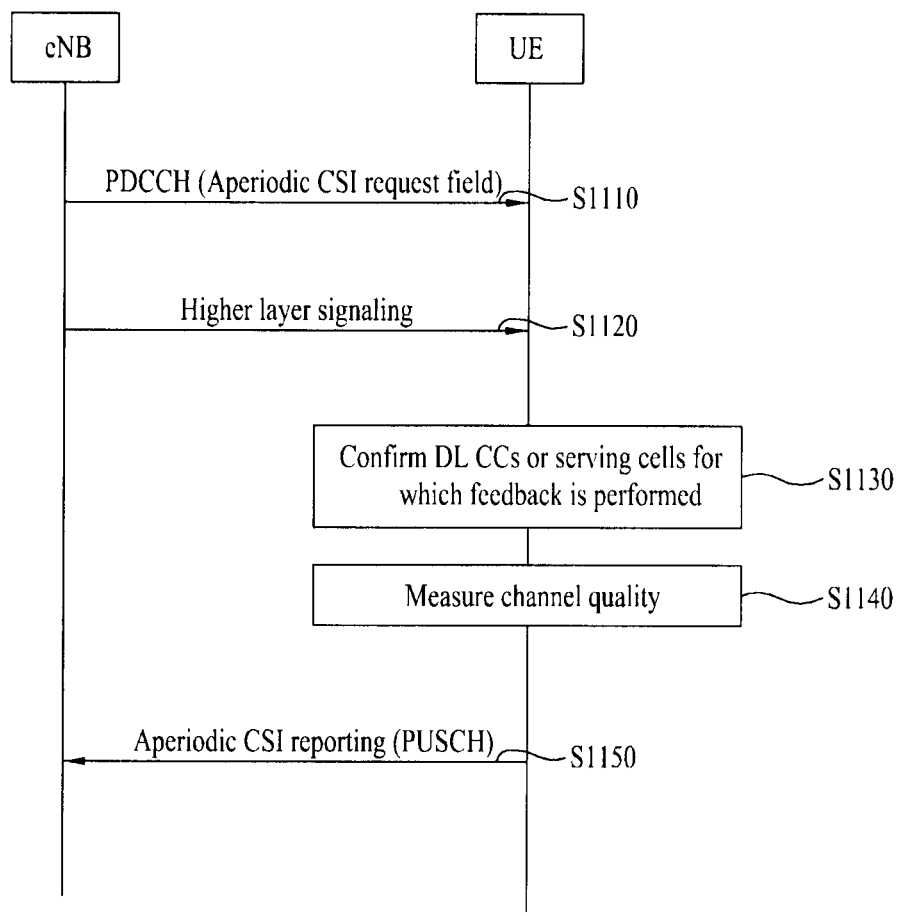
FIG. 11 is a diagram illustrating an aperiodic CSI reporting method in a CA environment according to an embodiment of the present invention.

FIG. 11 is a diagram illustrating an aperiodic CSI reporting method in a CA environment according to an embodiment of the present invention.

In the aperiodic CSI reporting method described in FIG. 11, operations of the eNB and UE may be changed according to a Common Search Space (CSS) or a UE-specific Search Space (USS) in which a PDCCH signal is transmitted.

The case in which the aperiodic CSI reporting method is triggered in the CSS will now be described first. In the CSS, a UL grant including an aperiodic CSI request field is set to DCI format 0. In this case, DCI format 0 is blind-decoded by being bit-aligned with DCI format 1A. Accordingly, the size of the aperiodic CSI request field may be scheduled as one bit to prevent additional BD overhead. The following Table 4 illustrates an exemplary aperiodic CSI request field format which can be used in the embodiments of the present invention.

TABLE 4

| Name | Size | Description |
| --- | --- | --- |
| Aperiodic CSI request | 1 bit | 0b0: no CSI reporting is requested<br>0b1: CSI reporting is requested. A DL CC for CSI report is configured by RRC scheduling. |

In Table 4, if the CSI request field is set to '0', this indicates that no CSI reporting is requested and, if the CSI request field is set to '1', this indicates that CSI reporting is requested and a DL CC necessary for CSI reporting is indicated to the UE though higher layer (e.g. RRC) signaling. In Table 4, the case in which the CSI request field is set to '1' may indicate that aperiodic CSI reporting for all DL CCs is requested. At this time, all DL CCs may be activated DL CCs or DL CCs configured in the UE through RRC signaling.

Next, the case in which the aperiodic CSI reporting method is triggered in the USS will be described. When the CSI reporting method is triggered in the USS, the aperiodic CSI request field may be set to 2 bits. That is, one bit may be added to a DCI format used in the USS. While aperiodic CSI is triggered using one bit in the LTE system, it may be triggered using two bits in the LTE-A system.

This method may be applied to a PDCCH transmitted in the USS. Table 5 illustrates another exemplary aperiodic CSI request field format which can be used in the embodiments of the present invention.

TABLE 5

| Name | Size | Description |
| --- | --- | --- |
| Aperiodic CSI request | 2 bits | 0b00: No CSI reporting is requested<br>0b01: CSI reporting for an SIB2 linked DL CC is requested<br>0b10: DL CC scheduling through RRC signaling<br>0b11: DL CC scheduling through RRC signaling |

Referring to Table 5, if the aperiodic CSI field is set to '00', this indicates that no aperiodic CSI reporting is requested. If the aperiodic CSI field is set to '01', this indicates that aperiodic CSI reporting for an SIB2 linked DL CC is requested. For example, if aperiodic CSI is set to '01' in a UL grant of a PDCCH signal detected by the UE through BD in the USS, this indicates that aperiodic CSI reporting is triggered with respect to a DL CC which has SIB2 linkage with a UL CC indicated by the corresponding UL grant. In this case, the UL CC is determined according to for which UL CC a PUSCH is scheduled through the corresponding UL grant. That is, when the UE and eNB use cross-carrier scheduling, the UE may discern information about a UL CC corresponding to the UL grant received through the CIF. If cross-carrier scheduling is not supported, a DL CC for aperiodic CSI reporting may be determined by a UL CC which has SIB2 linkage with a DL CC receiving the UL grant.

In Table 5, if the aperiodic CSI request field is set to '10' or '11', this indicates that aperiodic CSI reporting is triggered for CCs DL CCs allocated to the UE through higher layer (RRC) signaling.

Here, one of '10' and '11' of the aperiodic CSI request field may indicate aperiodic CSI reporting for all DL CCs. That is, '10' or '11' may indicate that aperiodic CSI reporting for all DL CCs (at this time, all DL CCs may be activated DL CCs or DL CCs configured for the UE) is requested.

In addition, one of '10' and '11' of the aperiodic CSI request field in Table 5 may be configured to coincide with a combination of DL CCs configured through RRC signaling, indicated by '1' of the aperiodic CSI request field of Table 4 included in the UL grant transmitted in the above-described CSS.

Referring to FIG. 11, the eNB may transmit a UL grant including the aperiodic CSI request field described with reference to Table 4 or 5 in the CSS or USS to the UE through a PDCCH signal (S1110).

If the aperiodic CSI request field of Table 4 is set to '1' or the aperiodic CSI request field of Table 5 is set to '10' or '11', the eNB may transmit higher layer signaling including information about DL CCs (or serving cells) for which aperiodic CSI reporting is to be performed to the UE (S1120).

In step S1120, information indicating DL CCs for feedback may be included in higher layer signaling. In the LTE-A system, a maximum of 5 CCs or serving cells may configure one wideband. In this case, information about DL CCs for feedback may be included in higher layer signaling in the form of a bitmap.

For example, the information about the DL CCs for feedback may have the form of '10'+'01001'. In this case, '10' of a front part indicates a field value of the aperiodic CSI request field transmitted by the UL grant of the PDCCH in step S1110 and '01001' of the rear part is used to indicate DL CCs for which feedback is requested among up to 5 CCs. Each bit of the bitmap indicates one DL CC and '01001' indicates an aperiodic CSI request for the second and fifth CCs.

In 5 bits indicating DL CCs, a position of each bit may indicate each CC according to a CC index, a frequency index, or a CIF value of CCs configured by the UE. For example, when 5 CCs configured by the UE are f1, f2, f3, f4, and f5 (where (f1<f2<f3<f4<f5), each bit of '01001' indicates f1, f2, f3, f4, and f5 starting from the beginning.

The bitmap information may be configured for DL CCs configured by the UE or activated DL CCs. When the eNB configures the bitmap information, it is possible to indicate effective information starting from the location of an MSB of a bitmap. If only 3 activated or configured DL CCs of a certain UE are present, all of the 5 bits need not be used. Accordingly, it is desirable to configure bitmap information such that effective information may be transmitted from the location of an MSB of a bitmap such as '101xx' among 5 bits of 'xxxxx'.

If there are remaining or unused bits caused by DL CCs which are not configured or activated among 5 bits used to indicate DL CCs for an aperiodic CSI report request, the corresponding bits are always set to '0', thereby eliminating an error or ambiguity of the UE. Therefore, the above '101xx' may be desirably set to '10100'.

Referring back to FIG. 11, the UE may confirm which DL CCs (serving cells) are used for aperiodic CSI measurement and reporting through higher layer signaling in step S1120 (S1130).

If the first and third DL CCs are used for aperiodic CSI feedback as in the above example, the UE may measure channel quality for the first and third DL CCs and generate associated CSI (S1140).

The UE may feed back the generated aperiodic CSI report to the eNB through a PUSCH region (S1150).

In step S1110, if the aperiodic CSI request field of Table 4 is set to '0' or the aperiodic CSI request field of Table 5 is set to '00', the UE performs only a periodic CSI report operation without performing an aperiodic CSI report operation. In this case, the UE may report CSI to the eNB not through the PUSCH region but through a PUCCH region.

In step S1110, if the aperiodic CSI request field of Table 5 is set to '01', CSI may be measured with respect to an SIB2 linked DL CC irrespective of higher layer signaling of step S1120 and the aperiodic CSI report operation may be performed.

Figure 12:
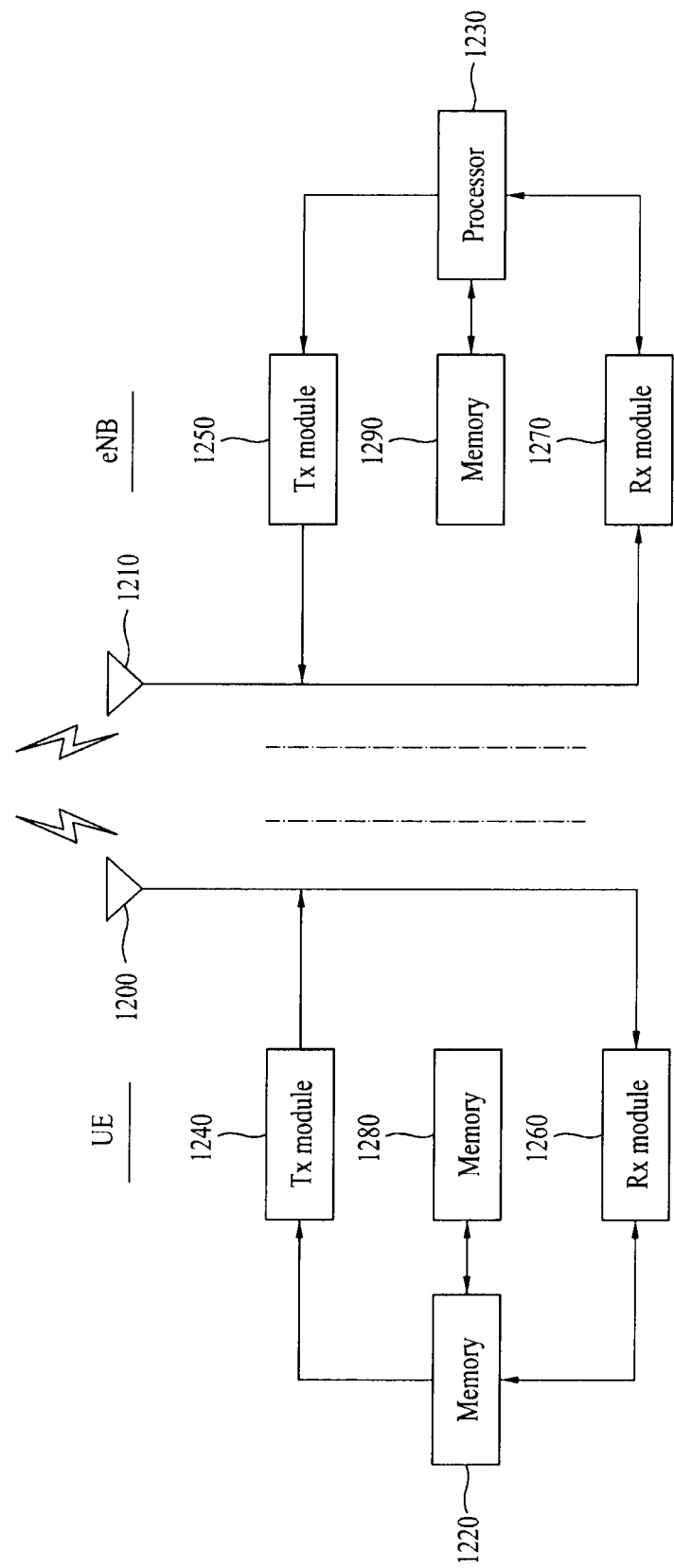
FIG. 12 is a diagram illustrating a UE and an eNB in which the embodiments of the present invention described with reference to FIG. 1 to FIG. 11 can be performed, according to another embodiment of the present invention

FIG. 12 is a diagram illustrating a UE and an eNB in which the embodiments of the present invention described with reference to FIG. 1 to FIG. 11 can be performed, according to another embodiment of the present invention.

The UE may operate as a transmitter in UL and as a receiver in DL. The eNB may operate as a receiver in UL and as a transmitter in DL.

The UE and eNB may include Transmit (Tx) modules 1240 and 1250 and Receive (Rx) modules 1250 and 1270, respectively, for controlling transmission and reception of information, data, and/or messages, and may include antennas 1200 and 1210, respectively, for transmitting and receiving the information, data, and/or messages.

The UE and eNB may include processors 1220 and 1230 for performing the above-described embodiments of the present invention and memories 1280 and 1290 for temporarily or permanently storing a processing procedure performed by the processors, respectively. The UE and eNB of FIG. 12 may further include one or more of an LTE module for supporting the LTE system and the LTE-A system and a low-power Radio Frequency (RF)/Intermediate Frequency (IF) module.

The Tx modules and Rx modules included in the UE and the eNB may perform a packet modulation/demodulation function for data transmission, a quick packet channel coding function, Orthogonal Frequency Division Multiple Access (OFDMA) packet scheduling, Time Division Duplex (TDD) packet scheduling, and/or a channel multiplexing function.

The apparatus described in FIG. 12 is a means for implementing the methods described with reference to FIG. 1 to FIG. 11. The embodiments of the present invention may be performed using constituent elements and functions of the aforementioned UE and eNB.

For example, the processor of the UE may receive a PDCCH signal including a UL grant and/or a CIF by monitoring a USS or CSS. Especially, an LTE-A UE may receive the PDCCH signal without blocking the PDCCH signal with another LTE UE by performing BD for an extended CSS. The processor of the UE may confirm DL CCs or serving cell for CSI measurement and control CSI measurement and aperiodic CSI reporting for corresponding DL CCs, by confirming an aperiodic CSI report request field received from the eNB.

Meanwhile, the UE in the present invention may be any of a Personal Digital Assistant (PDA), a cellular phone, a Personal Communication Service (PCS) phone, a Global system for Mobile (GSM) phone, a Wideband CDMA (WCDMA) phone, a Mobile Broadband System (MBS) phone, a hand-held PC, a notebook PC, a smartphone, a Multi Mode-Multi Band (MM-MB) terminal, etc.

The smartphone is a terminal mixing the advantages of both a mobile communication terminal and a PDA and may refer to a terminal in which data communication functions such as scheduling management, fax transmission and reception, and Internet access, which are functions of the PDA, are incorporated into the mobile communication terminal. The MM-MB terminal refers to a terminal which has a multi-modem chip therein and which can operate in any of a mobile Internet system and other mobile communication systems (e.g., a CDMA 2000 system, a WCDMA, etc.).

The embodiments of the present invention may be achieved by various means, for example, hardware, firmware, software, or a combination thereof.

In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. For example, software code may be stored in the memory units 1280 and 1290 and executed by the processors 1220 and 1230. The memory units are located at the interior or exterior of the processor and may transmit data to and receive data from the processor via various known means.

The embodiments of the present invention may be carried out in other specific ways without departing from the spirit and essential characteristics of the present invention. Accordingly, the above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention may be applied to various wireless access systems, for example, a 3GPP LTE system, a 3GPP LTE-A system, a 3GPP2 system, and/or an IEEE 802.xx system. The embodiments of the present invention may be applied not only to the above various wireless access systems but also to all technical fields applying the various wireless access systems.

The invention claimed is:

1. A method for transmitting an aperiodic feedback in a wireless access system supporting multicarrier aggregation, the method comprising:
   receiving, by a user equipment (UE) from an evolved Node-B (eNB), a radio resource control (RRC) signal including information indicating two or more downlink component carriers (DL CCs);
   receiving, by the UE from the eNB, an uplink grant including a carrier indicator field and a request field, the request field indicating that an aperiodic feedback is triggered for the two or more DL CCs; and
   transmitting, by the UE to the eNB, a physical uplink shared channel (PUSCH) via an uplink CC indicated by the carrier indicator field, the PUSCH including the aperiodic feedback for the two or more DL CCs indicated by the information.

2. The method according to claim 1, further comprising:
   measuring channel quality for the aperiodic feedback of the DL CCs indicated by the RRC signal.

3. The method according to claim 1, wherein the request field is included in a downlink control information (DCI) format 0.

4. The method according to claim 1, wherein a size of the request field is set to 2 bits for indicating that the aperiodic feedback is triggered for the two or more DL CCs.

5. The method according to claim 1, wherein the PUSCH is transmitted four subframes after receiving the uplink grant.

6. A method for receiving an aperiodic feedback in a wireless access system supporting multicarrier aggregation, the method comprising:
   transmitting, by an evolved Node-B (eNB) to a user equipment (UE), a radio resource control RRC signal including information indicating two or more downlink component carriers (DL CCs);
   transmitting, by the eNB to the UE, an uplink grant including a carrier indicator field and a request field, the request field indicating that an aperiodic feedback is triggered for the two or more DL CCs; and
   receiving, by the eNB from the UE, a physical uplink shared channel (PUSCH) via an uplink CC indicated by the carrier indicator field, the PUSCH including the aperiodic feedback for the two or more DL CCs indicated by the information.

7. The method according to claim 6, wherein the request field is included in a downlink control information (DCI) format 0.

8. The method according to claim 6, wherein a size of the request field is set to 2 bits for indicating that the aperiodic feedback is triggered for the two or more DL CCs.

9. The method according to claim 6, wherein the PUSCH is transmitted four subframes after receiving the uplink grant.

10. An apparatus for transmitting aperiodic feedback in a wireless access system supporting multicarrier aggregation, the apparatus comprising:
    a transmitter;
    a receiver; and
    a processor that controls the receiver to:
    receive, from an eNB, a radio resource control (RRC) signal including information indicating two or more downlink component carriers (DL CCs); and
    receive, from the eNB, un uplink grant including a carrier indicator field and a request field, the request field indicating that an aperiodic feedback is triggered for the two or more DL CCs; and the transmitter to transmit, to the eNB, a physical uplink shared channel (PUSCH) via an uplink CC indicated by the carrier indicator field, the PUSCH including the aperiodic feedback for the two or more DL CCs indicated by the information.

11. The apparatus according to claim 10, wherein the processor further configured to measure channel quality for the aperiodic feedback of the DL CCs indicated by the RRC signal.

12. The apparatus according to claim 10, wherein the request field is included in a control information (DCI) format 0.

13. The apparatus according claim 10, wherein a size of the request field is set to 2 bits for indicating that the aperiodic feedback is triggered for the two or more DL CCs.

14. The apparatus according claim 10, wherein the PUSCH is transmitted four subframes after receiving the uplink grant.

15. An apparatus for receiving an aperiodic feedback in a wireless access system supporting multicarrier aggregation, the apparatus comprising:

a transmitter;
a receiver; and
a processor that controls the transmitter to:
transmit, to a UE, a radio resource control (RRC) signal including information indicating two or more downlink component carriers (DL CCs); and
transmit, to the UE, an uplink grant including a carrier indicator field and a request field, the request field indicating that an aperiodic feedback is triggered for the two or more DL CCs, and
the receiver to receive, from the UE, a physical uplink shared channel (PUSCH) via an uplink CC indicated by the carrier indicator field, the PUSCH including the aperiodic CSI feedback for the two or more DL CCs indicated by the information.

16. The apparatus according to claim 15 wherein the request field is included in a control information (DCI) format 0.

17. The apparatus according to claim 15, wherein a size of the request field is set to 2 bits for indicating that the aperiodic feedback is triggered for the two or more DL CCs.

18. The apparatus according claim 15, wherein the PUSCH is transmitted four subframes after receiving the uplink grant.

* * * * *